Patented Feb. 26, 1929.

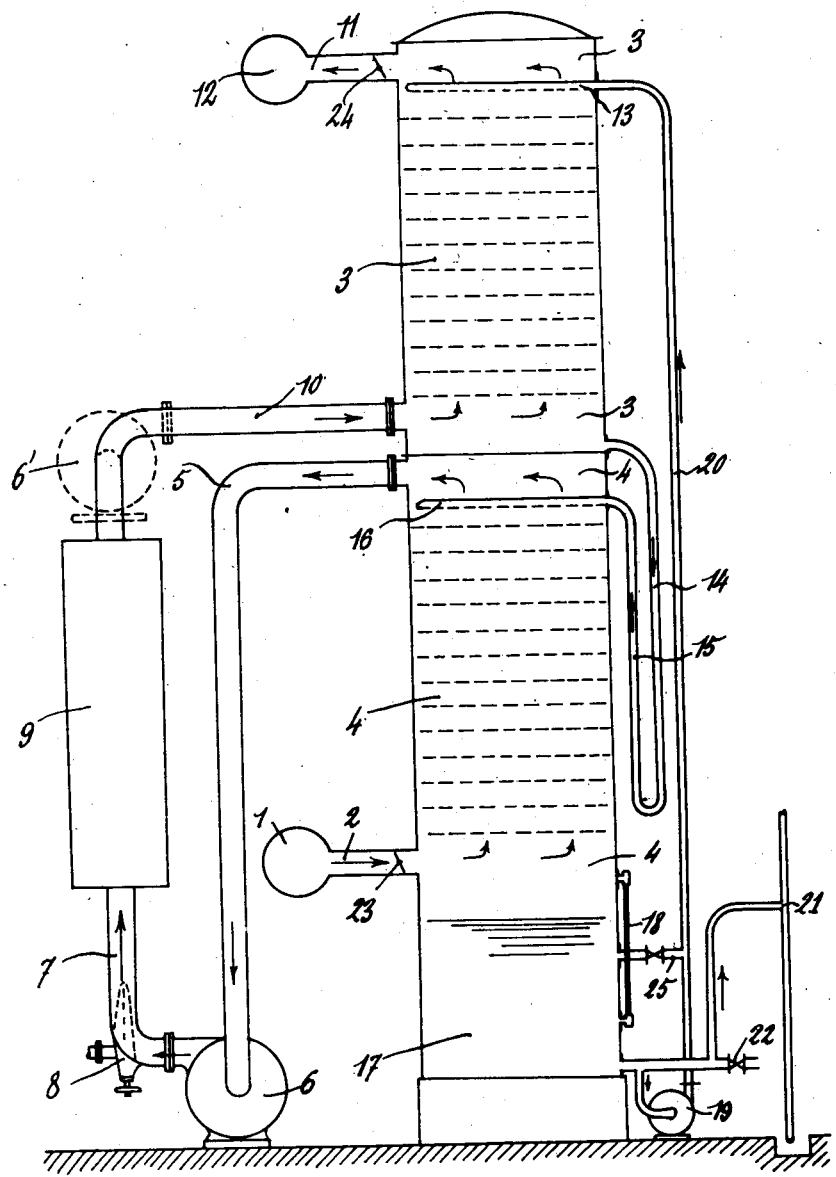

1,703,747

UNITED STATES PATENT OFFICE.

GEORGES LÉON EMILE PATART, OF PARIS, FRANCE.

ARRANGEMENT FOR THE RECOVERY OF HEAT AND WATER VAPOR IN GASEOUS REACTIONS.

Application filed January 14, 1925, Serial No. 2,446, and in France January 21, 1924.

In certain gaseous reactions it is necessary to employ an excess of water vapor and to preliminary heat the gases, even though the reaction itself is exothermic so that a great advantage would be afforded by the simultaneous recovery of the heat and the water vapor which are withdrawn by the gases resulting from the reaction, in order to restore the same to the fresh gases which are to be supplied to the apparatus.

This is particularly the case for the catalytic production of hydrogen by the process which is based upon the action of water vapor upon carbon monoxide in the presence of a catalyst. The theoretical and practical observation of this reaction shows that advantageous results can only be obtained by the use of triple or quadruple the amount of water vapor which is theoretically employed in the reaction in each treatment by the catalyst, and further by maintaining the catalyzing chamber at a temperature near 500° C.

In order to carry the said process into effect on an economical scale, these two circumstances will require the maximum recovery of the excess of water vapor which is mingled with the gas before circulating the same upon the catalyst, and also of the heat withdrawn by the gases issuing from the catalyzing apparatus.

As concerns the recovery of the heat, this may readily be effected to a certain degree in the known temperature-exchanging devices of the tubular type. As regards the water vapor, this is usually recovered by treating the discharged gases with a shower of water which becomes heated while partially condensing the water vapor; the water thus heated is subsequently placed in intimate contact with the fresh gases supplied to the catalyzing apparatus, and the said gases thus become charged with a quantity of water vapor corresponding to their pressure and to the temperature of the hot water used in the shower treatment of the said gases.

The present invention has for its object an arrangement for effecting the said operation of the recovery of the water vapor and the heat to the maximum degree and in the most economical conditions.

The said arrangement consists essentially of a vertical apparatus comprising two superposed parts. In the upper part is effected firstly the cooling of the gases issuing from the catalyzing operation and the condensation of the major part of the water vapor which they contain, and secondly the heating of the cooling water. In the lower part there is effected firstly the heating of the fresh gases and the saturation of the same with water vapor at the maximum temperature and secondly the cooling of the water which has been heated in the upper part. The water thus cooled is collected at the bottom of the lower part of the apparatus and is elevated to the top of the upper part, and this cycle is repeated indefinitely, the excess of the condensed water vapor being optionally evacuated in a continuous manner as cold water.

The circulation of the gases is effected by a high power centrifugal device which according to the invention serves to withdraw the gases which are heated at the top of the lower part of the apparatus—i. e. at the precise point at which they are in contact with the water having the highest temperature—and to discharge the same at a sufficient pressure in order to circulate them at the proper speed through the remainder of the circuit which comprises the catalyzing apparatus and its accessories and the upper part of the recovery apparatus. The action of the suction and delivery of the said centrifugal apparatus may optionally be reinforced by a steam ejector which is placed in series therewith and through which the required excess of water vapor is supplied to the circuit.

The water which is heated while circulating in the upper part of the apparatus descends to the top of the lower part of the apparatus through a siphon which forms the sole communication between the two parts of the apparatus. Both of these latter parts contain suitable devices affording an intimate contact between the gases and the liquid, which devices may consist of chambers filled with coke, or of rings or spirals, but they are preferably (and according to the present invention) formed of bubbling plates which are provided with caps and have small apertures therein which divide the gases into bubbles of very small size within the liquid which is circulating between the several plates.

The bottom of the lower part forms a regulating reservoir in which a constant level can be maintained by means of an overflow or by a regulated supply of cold water.

Throttle valves or other regulating valves which are mounted upon the inlet and the outlet conduits allow of maintaining the pressure of the gases in the two parts of the column at the most favourable values according to the readings of the thermometers and pressure gauges which are disposed at different parts of the apparatus and which afford an exact indication of the temperature and of the degree of saturation of the heated or cooled gases. In like manner, the output of water may be regulated by simple means.

The shape of the apparatus may be varied at will; its horizontal section is preferably circular or rectangular, and its dimensions as well as the number of plates (which determine its height) are chosen according to the quantity of the gases under treatment, their temperature, their degree of saturation, and the extent of the recovery which is desired. The heated parts of the apparatus are well insulated.

The drawings accompanying the present description, which represent one of the constructional forms of the said device, are given solely by way of example and in order to facilitate the comprehension of the preceding principles, and without limiting the scope of the said invention.

The said apparatus for the recovery of heat and vapor is herein represented as a vertical column whereof 3 is the upper part and 4 the lower part, the bottom of the upper part 3 being connected by an inverted siphon 14, 15 with the top of the lower part 4, this latter having at the bottom the regulating reservoir 17. The gases supplied by the gas holder—and supposed to be at the ordinary temperature—are withdrawn from the main conduit 1 through the branch conduit 2; they enter at the bottom of the lower part 4 above the normal level of the regulating reservoir 17; the gases ascend through a set of bubbling plates receiving a downward current of heated vapor supplied from the top of the apparatus. During their upward flow, the gases become heated and are saturated with water vapor, whilst the water is cooled when descending and evaporating; if the number of plates is sufficient, and the pressure which is produced at the upper part is sufficiently low, the difference in temperature between the water and the gases when entering and when leaving this region will be very small, and the proportion of water vapor withdrawn by the gases at their discharge may be as great as desired. The gases are evacuated at the upper part of 4 through a conduit 5 leading to a centrifugal suction fan 6 of high power which acts concurrently with a steam ejector 7 in order to introduce into the gases the additional amount of water vapor required for the reaction. The gases discharged from the suction device and the ejector are circulated into a catalyzing apparatus which is shown diagrammatically at 9 together with its accessories such as temperature, exchanging devices and the like. The gases issue therefrom at a high temperature together with an excess of water vapor which has not entered into the reaction, and under the pressure produced by the discharge from 6, and they are circulated through the conduit 10 into the bottom part of the upper portion 3 of the recovery apparatus; the gases rise within the latter (as in the preceding case in the lower part) through a set of bubbling plates upon which is delivered the water which has been cooled during its circulation in the lower part, it having been taken up and then discharged into the top of the apparatus. During this traject, the gases become cooled and yield up a portion of the water vapor which they contain, whilst the water becomes heated during its descent in contact with the said gases. If the number of plates is sufficient and the quantity of water suitably determined, the temperature of the water on the lower plate will be very near the temperature of the gases entering the apparatus.

The water which is cooled is collected in the regulating reservoir 17 situated at the bottom of the lower part of the apparatus, and is maintained therein at a constant level by means of a level gauge which is disposed at 18; the water is withdrawn by a pump 19 which delivers it through the pipe 20 to the top of the upper part of the apparatus, and the circulation then follows the same cycle as has been above described. A constant level is maintained in the reservoir 17 by means of an overflow 21 and a cold water supply 22. As concerns the speed of the circulation of the gases and their pressure, these may be regulated—independently of the speed of the centrifugal device 6—by the throttle or like valves 23 and 24 mounted on the gas inlet and outlet conduits; furthermore, the branch 25 provides for the regulation of the rate of the flow of the water upon the plates and therefore of the final temperatures in the two regions of the apparatus.

Obviously, the same recovery apparatus may be utilized with a plurality of catalysis apparatus. The centrifugal device 6 may have added thereto a second and like device 6' which is disposed forwardly of the delivery of the gases into the upper part of the column.

What I claim is:

1. In apparatus for the heating of fresh gases and for recovery of the water vapor contained in the gases, two superposed columns, bubbling plates in the columns, means to supply fresh gases to the lower part of the lower column for ascent therethrough, means to withdraw the gases from the top of said column and maintain a sub-atmospheric pressure at said top, means in which said gases are caused to react, means to conduct the resulting product to the bottom of the upper column and means to conduct the product from the top of the latter column after passage through the plates therein and means to supply water from the bottom of each column to the top of the other column.

2. In apparatus for the heating of fresh gases and for the recovery of the water contained in the gases; two superposed columns, bubbling plates in the columns, the lower column having a water space below the plates therein, means to supply fresh gases to the lower column below its plates, means to withdraw the gases from the top of the lower column and maintain sub-atmospheric pressure thereat, a reaction chamber for receiving the withdrawn gases, means to conduct the products to the lower end of the upper column, means to withdraw them from the upper end of the latter column, a spray pipe at the top of the latter column, a pump connected to said water space and pipe, a spray pipe at the top of the lower column, a siphon connecting the bottom of the upper column and the latter spray pipe and valves controlling the entrance of gas to the lower column and exit from the upper column.

3. In apparatus for the heating of fresh gases and for the recovery of the water contained in the gases; two superposed columns, bubbling plates in the columns, the lower column having a water space below the plates therein, means to supply fresh gases to the lower column below its plates, means to withdraw the gases from the top of the lower column and maintain sub-atmospheric pressure thereat, a reaction chamber for receiving the withdrawn gases, means to conduct the products to the lower end of the upper column, means to withdraw them from the upper end of the latter column, a spray pipe at the top of the latter column, a pump connected to said water space and pipe, a spray pipe at the top of the lower column, a siphon connecting the bottom of the upper column and the latter spray pipe, valves controlling the entrance of the gas to the lower column and exit from the upper column, means to maintain a constant level in the liquid space and a valved by-pass between the suction and delivery side of said pump to control its effective delivery to the upper column.

In testimony that I claim the foregoing as my invention, I have signed my name hereto.

GEORGES LÉON EMILE PATART.